Oct. 19, 1948. T. TECLU 2,451,588
GRINDING FIXTURE
Filed July 30, 1945 2 Sheets-Sheet 1

INVENTOR.
THEODORE TECLU
BY
ATTORNEYS

Oct. 19, 1948.　　　　T. TECLU　　　　2,451,588
GRINDING FIXTURE
Filed July 30, 1945　　　　　　　　　　2 Sheets-Sheet 2
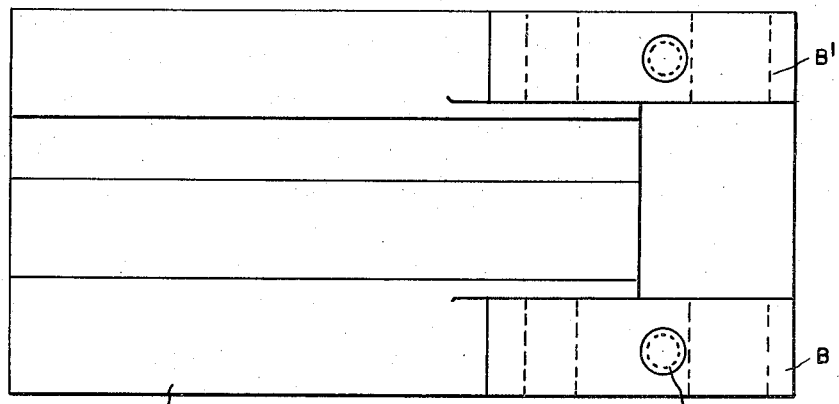
FIG.3.
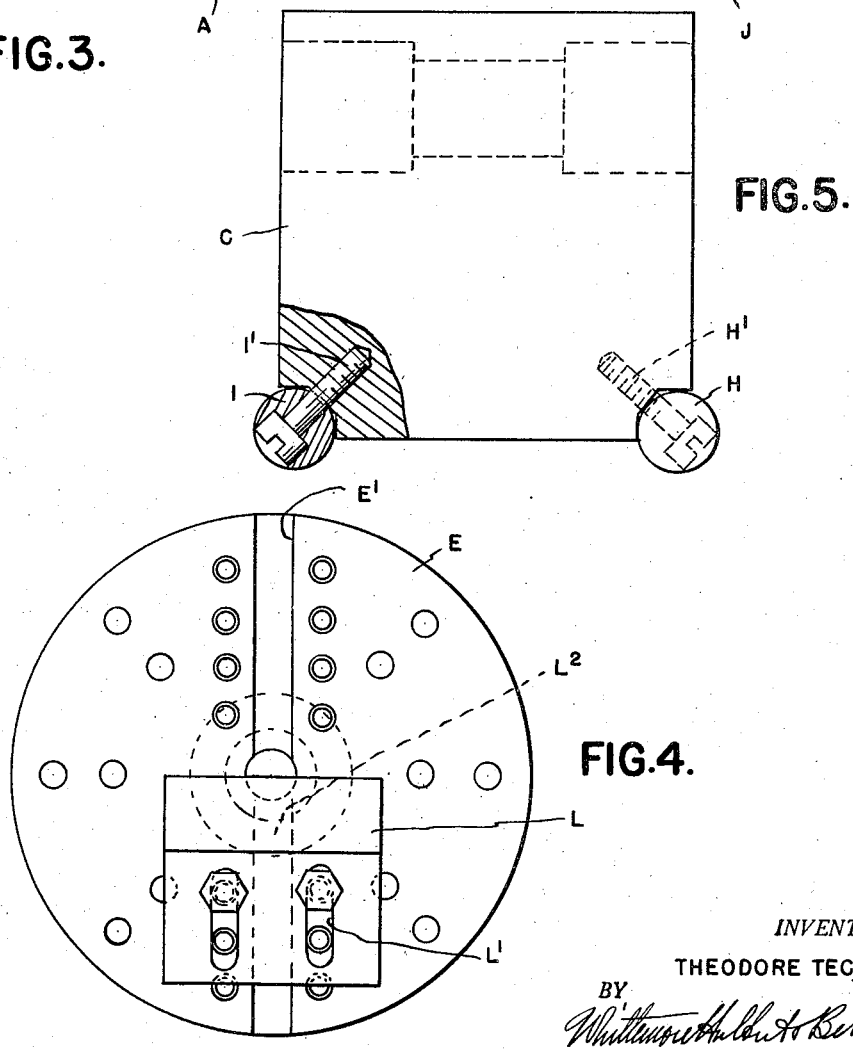
FIG.5.
FIG.4.
*INVENTOR.*
THEODORE TECLU
BY
ATTORNEYS Patented Oct. 19, 1948

2,451,588

UNITED STATES PATENT OFFICE 2,451,588

GRINDING FIXTURE

Theodore Teclu, Detroit, Mich.

Application July 30, 1945, Serial No. 607,798

3 Claims. (Cl. 51—237)

The invention relates to grinding machines and has for its object the obtaining of a simple fixture through which the work may be held with great accuracy in predetermined relation to the grinder wheel. To this end the invention consists in the construction as hereinafter set forth.

In the drawings:

Fig. 3 is a plan view of the base member of the fixture;

Fig. 4 is a front elevation of the face plate; and

Fig. 5 is a side elevation of the sine bar.

Figure 1:
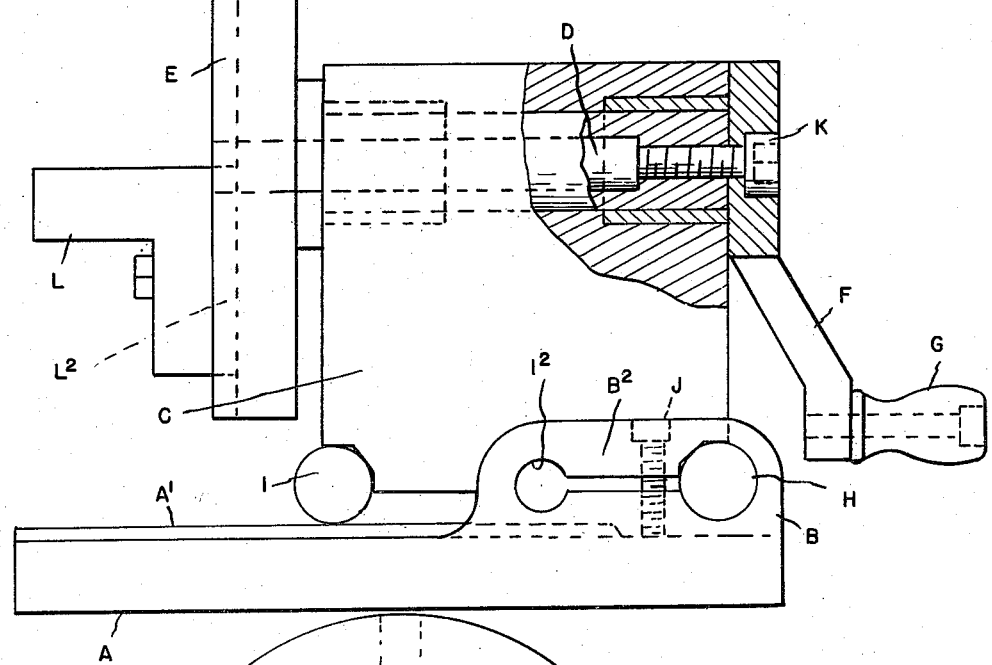
Fig. 1 is a side elevation partly in section of my improved grinding fixture.
Figure 2:
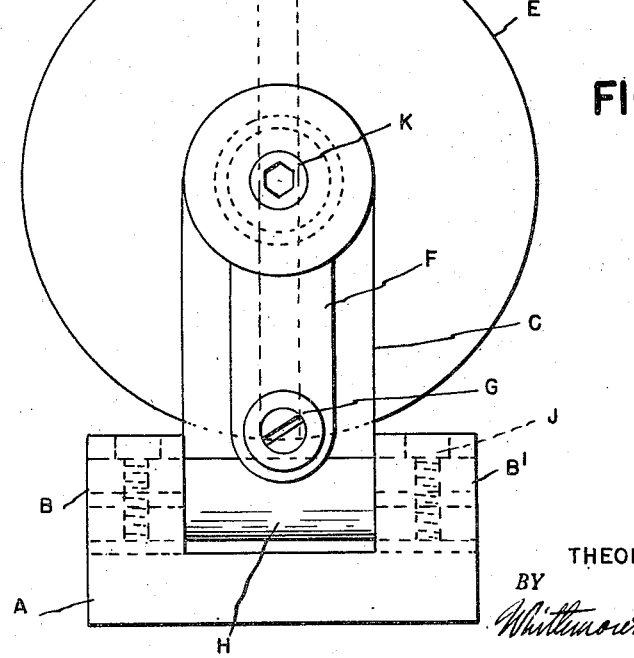
Fig. 2 is an end elevation thereof.

A is a base plate preferably of rectangular form and is provided with a pair of spaced upwardly extending integral ears B and B'. Extending between said ears and pivotally connected thereto is a sine bar member C which extends upward and has journaled in its upper portion a longitudinally extending shaft D carrying at one end a circular head or face plate E. At the opposite end of the shaft is a crank arm F having an operating handle G by which the head or face plate E may be turned to any desired degree.

For positioning the sine bar C so that the axis of the shaft D is exactly parallel with the base plate A, I have provided the following construction. H is a pivot pin for engaging transversely aligned bores in the ears B and B'. This pin is secured to the sine bar by engaging a polygonal notch in one corner of the bar and clamping it in such position by screws H'. These screws pass through the pin and extend diagonally into threaded apertures in the sine bar, the heads of the screws being concealed in counterbores in the pin. At the opposite lower corner of the sine bar is a similar pin I similarly secured by screws I'. The base plate A has a strip A' on its upper face which is ground to be exactly parallel to the bottom face of said plate. This face is in such relation to the pins H and I that when the latter is in contact therewith, the axis of the shaft D will be parallel to said face and also the bottom face of the base. On the other hand, when the sine bar is turned on the pivot pin H, it may be arranged at any predetermined angle less than ninety degrees to the base and this may be accurately measured by the use of blocks inserted between the face A' and the pin I. For locking the sine bar after angular adjustment thereof, the ears B and B' are slotted between the bores for receiving the pin H and bores I². This provides a resiliently yieldable portion B² which by means of a screw J may be drawn downward to clamp the pin H and prevent rotation thereof. The handle F is attached to the shaft D by a screw K so that by tightening this screw said handle will be clamping against the sine bar C to prevent any rotation of the shaft. It will, therefore, be apparent that angular adjustment of the sine bar C with respect to the base may be first made and the parts locked in this position by the screws J and also angular adjustment of the head E may be made by the handle G and crank F after which the clamping screw K will lock these parts from further displacement. These two adjustments will provide for holding the work secured to the face plate E in any desired angular relation to the path of the grinder wheel.

To further assist in mounting the work upon the head or face plate E, an angle bracket L is secured to said face plate by clamping screws passing through slotted apertures L' and engaging threaded apertures in the face plate. The face plate is also preferably provided with a channel E' extending diametrically thereacross and a key L² on the angle bracket L engages this channel to hold one face of the bracket in a plane perpendicular thereto. The base plate A is secured in any suitable way to the table of the grinder machine, preferably by the use of a magnetic clutch. When thus secured, the sine bar C may be adjusted to the desired inclination and the head E rotated to any desired degree by the handle G and crank F, the parts being locked in such adjusted positions by the screws J and K.

What I claim as my invention is:

1. A work holding fixture for grinding machines comprising a base plate having a pair of integral ears extending upward therefrom, a sine bar extending between said ears, a pivot pin for attaching said sine bar to said ears located at one corner of the former, a pin at the opposite lower corner of said sine bar, a shaft journaled in said sine bar to extend longitudinally thereof and carrying at one end a work supporting head or face plate, a crank at the opposite end of said shaft for rotating the same, a clamping screw connecting said crank to said shaft and adapted to hold the latter from rotation when in a desired position of adjustment, and a longitudinally extending surface strip on the upper face of said base exactly parallel to the bottom face thereof and adapted when said last mentioned pin is in contact therewith to hold the axis of said shaft parallel to said base, said pin also forming a bearing for a gauge by which the height of adjustment above said base is exactly determined.

2. A work holding fixture for grinding machines comprising a base plate having a pair of spaced integral ears extending upward therefrom and a slightly raised top surface portion parallel to the bottom surface thereof, a rectangular block constituting a sine bar extending between said ears, cylindrical pins secured to the opposite lower corners of said block in parallelism to each other, one of said pins being extended to engage pivot bearings in said ears and the other pin when contacting said raised top surface holding said sine bar parallel to said base, a shaft journaled in said block to extend longitudinally thereof and carrying at one end beyond said block a work supporting head or face plate in a plane perpendicular to the axis of said shaft, a crank at the opposite end of said shaft for rotatably adjusting the same to an unlimited extent, clamping means for holding said shaft in its adjusted position, and clamping means for the pivot bearings in said ears for holding said sine bar in any position of angular adjustment.

3. A work holding fixture for grinding machines comprising a base plate having a pair of spaced integral ears extending upward therefrom and having aligned split pivot bearings therein, the slots of said split bearings terminating within the boundaries of said ears, a rectangular block constituting a sine bar extending between said ears, cylindrical pins secured to the opposite lower corners of said block in parallelism to each other, one of said pins being extended to engage said pivot bearings permitting adjustment of said sine bar into different angular positions, clamping screws bridging the slots of said split bearings to hold said sine bar in its adjusted position, the other of said pins forming a bearing for a gauge block and setting said sine bar to an exactly predetermined position, a shaft journaled in said block to extend longitudinally thereof, a work holding head at one end of said shaft beyond and clear of said block having a face in a plane perpendicular to the axis of said shaft, adjusting means at the opposite end of said shaft for unlimited rotary adjustment of said head, and clamping means for holding said shaft in its adjusted position.

THEODORE TECLU.

REFERENCES CITED

The following references are of record in the file of this patent:

UNITED STATES PATENTS

| Number | Name | Date |
| --- | --- | --- |
| 1,395,664 | Benson | Nov. 1, 1921 |
| 1,551,995 | Lovenston | Sept. 1, 1925 |
| 2,111,299 | Robbins | Mar. 15, 1938 |
| 2,351,773 | Lovenston | June 20, 1944 |